Dec. 24, 1946. C. E. COLEGROVE Re 22,822

SEWING MACHINE ARM

Original Filed April 27, 1944 3 Sheets-Sheet 1

INVENTOR.
CHARLES E. COLEGROVE.
BY
Kwis Hudson Boughton & Williams
ATTORNEYS.

Dec. 24, 1946. C. E. COLEGROVE Re 22,822

SEWING MACHINE ARM

Original Filed April 27, 1944 3 Sheets-Sheet 2

INVENTOR.
CHARLES E. COLEGROVE.
BY
Kurz Hudson Baughton & Williams
ATTORNEYS.

Dec. 24, 1946. C. E. COLEGROVE Re 22,822

SEWING MACHINE ARM

Original Filed April 27, 1944 3 Sheets-Sheet 3

INVENTOR.
CHARLES E. COLEGROVE.
BY
Kuris Hudson Boughton & Williams
ATTORNEYS.

Reissued Dec. 24, 1946

Re. 22,822

UNITED STATES PATENT OFFICE 22,822

SEWING MACHINE ARM

Charles E. Colegrove, Lakewood, Ohio, assignor to Sears, Roebuck and Company, Chicago, Ill., a corporation of New York Original No. 2,390,571, dated December 11, 1945, Serial No. 532,987, April 27, 1944. Application for reissue April 19, 1946, Serial No. 663,433

15 Claims. (Cl. 112—258)

This invention relates to a sewing machine and particularly to the construction of the sewing machine head.

An object of the invention is to provide a sewing machine head wherein the arm bracket or gooseneck and the parts carried thereby are so constructed and organized that substantially all of the movable parts, the spool or spools of thread, the bobbin winder, the thread to the needle and various other parts or elements are concealed within the arm bracket but are readily accessible for purposes of replacement, adjustment, repair and the like.

Another object of the invention is to provide a sewing machine arm bracket having the horizontal portion thereof constructed to house and conceal one or more spools of thread yet at the same time providing ready access to said spool or spools.

Another object is to provide a sewing machine arm bracket wherein the spool of thread for the needle and the thread which passes from said spool to the needle are concealed but are readily accessible for installation or removal purposes.

Another object is to provide a sewing machine arm bracket which is so constructed that it can house and conceal in the horizontal portion thereof a bobbin winder and a spool for supplying thread to the bobbin winder, yet has provision for making said spool and bobbin winder readily accessible.

A further object is to provide an improved bobbin winder that is susceptible of being mounted and housed within the horizontal portion of a sewing machine arm bracket.

Another object is to provide a sewing machine arm bracket, that is so constructed as to conceal the driving connection between the needle bar shaft and the machine actuating source and yet permits ready access to said connection for purposes of adjustment, replacement, repair or the like.

Another object is to provide a novel connection between the hand wheel and the needle bar shaft and which, in combination with the object just above mentioned, facilitates the accessibility to the driving connection to the needle bar shaft although normally completely concealing and housing said driving connection.

A more general object is to provide a sewing machine arm bracket which is so constructed and combined with the other elements of the sewing machine as to reduce to a minimum the exposed projecting parts and accessories usually found on sewing machine arm brackets, wherefore the arm bracket embodying the present invention is on its exterior of pleasing symmetrical appearance.

Further and additional objects and advantages not hereinbefore referred to will become apparent during the detailed description of embodiments of the invention which is to follow. Referring to the accompanying drawings.

Figure 1:
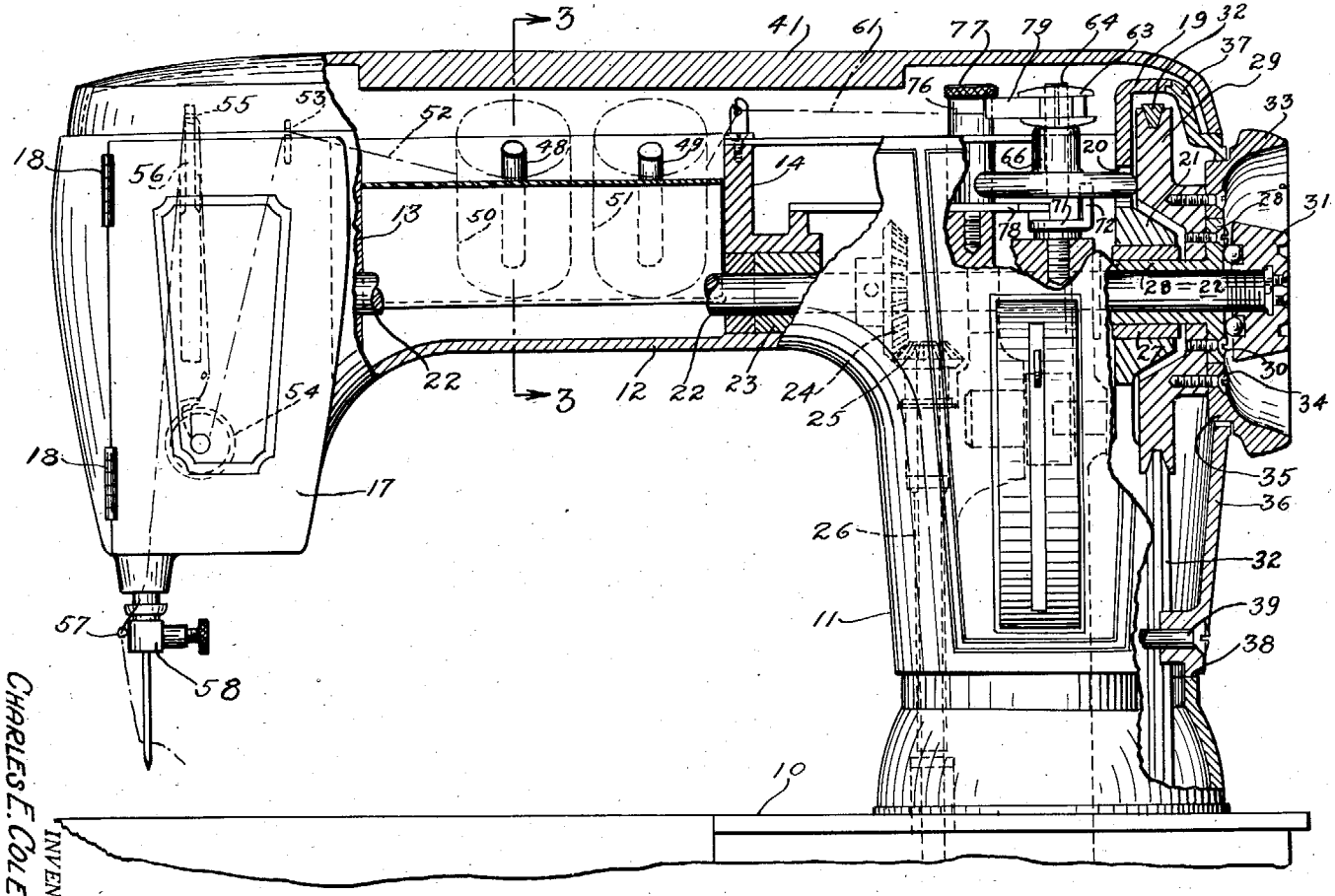
Fig. 1 is a fragmentary front side view of a sewing machine head with the arm bracket thereof shown partly in section and partly in elevation.

The sewing machine head illustrated herein and embodying the invention comprises a bed plate 10 on which is located the arm bracket or gooseneck of the machine. This arm bracket or gooseneck is shown as formed of a metal casting, but it will be understood that said bracket or gooseneck might be otherwise constructed without departing from the invention. The arm bracket or gooseneck includes a vertical column 11 from the upper end of which extends the horizontal portion 12, the said column and the said horizontal portion being integral with each other as is common in sewing machine goosenecks or arm brackets. The horizontal portion 12 and the vertical column 11 are substantially hollow. The hollow horizontal portion 12 intermediate its ends is provided with spaced transversely extending partitions 13 and 14, see particularly Figs. 1 and 2. An internal wall 15 extends longitudinally of the horizontal portion of the arm bracket from the partition 13 toward the left and said wall is inwardly of the front face of the horizontal portion and provides a cavity 16 adjacent to the usual needle bar and take-up mechanisms. This cavity is normally concealed or covered by a cover member or door 17 hinged at 18 to swing outwardly on a vertical axis from the closed position indicated by full lines in Fig. 2 to the open position indicated by dash lines therein. The purpose of providing this cavity will later be pointed out.

The arm bracket is also provided internally with a wall 19 adjacent the right hand end of the bracket and said wall has a slot or opening 20 formed therein and is provided with a bearing boss 21 in which is rotatably supported the needle bar shaft 22. This shaft is also rotatably supported intermediate its ends in a bearing 23 carried by the horizontal portion 12 of the bracket and the partition 14. The left hand end of the needle bar shaft 22 extends into and is rotatably supported by a suitable bearing, not shown, and carried by the partition 13. The needle bar shaft 22 is operatively connected at its left hand end to the needle bar in a manner well understood by those skilled in the art.

The needle bar shaft 22 to the right of the bearing 23 has fixed thereto a bevel gear 24 which meshes with a bevel gear 25 fixed on the upper end of a vertically extending shaft 26 rotatably mounted in the column 11 and extending below the bed plate 10 where its lower end is operatively connected to the shaft that actuates the rotary loop taker of the machine which is not shown as it forms no part of the present invention and is well understood in the art. The needle bar shaft 22 is also operatively connected through suitable mechanism with the feed mechanism of the machine as will be well understood by those skilled in the art.

The bearing boss 21 supports a bearing bushing 27 and said bushing in turn rotatably supports a sleeve 28 that is freely rotatable on the needle bar shaft 22. The sleeve 28 at its outer or right hand end is provided with a flange 28*a* which projects radially outwardly part way of and in contact with the hub portion of a driving pulley 29 and is secured to said hub portion by suitable means such as the screws 30.

The outer or right hand end of the needle bar shaft 22 is threaded and has mounted thereon a clutch nut 31 which when tightened locks the sleeve 28 to the shaft 22, wherefore the pulley 29 will rotate with the shaft. When the clutch nut 31 is loosened the sleeve 28 is free to rotate independently on the shaft 22. A flexible belt 32 extends around the pulley 29 and at its lower end below the bed plate 10 around a pulley, not shown, and which latter pulley is driven by the actuating means for the sewing machine, which may be an electric motor or other suitable means. The flexible belt 32 and the pulley 29 form, in this instance, the driving connection to the needle bar shaft 22, but it will be understood that a different type of driving connection might be employed should it be so desired.

A hand wheel 33 is secured to the hub portion of the pulley 29 by suitable securing means as, for instance, the screws 34. This hand wheel has a reduced portion which projects through and substantially fills an opening 35 in a removable closure plate 36. The closure plate 36 extends from front to rear of the arm bracket and has its upper end fitting the upper flanged end of the wall 19, as indicated at 37, while its lower end engages and merges with the vertical column as indicated at 38. The closure plate 36 is secured in position by means of suitable securing members, such as the screws 39 and 40, see Figs. 1 and 4.

It will be noted that in order to have access to the driving connection to the needle bar shaft 22, in this instance the belt 32 and the pulley 29, all that need be done is to remove the screws 34 and detach the hand wheel 33 and then remove the screws 39 and 40 and detach the cover plate 36. In this way access to the drawing connection is readily obtained while said connection is completely concealed normally by the cover or closure plate 36 and the hand wheel 33.

The horizontal portion of the arm bracket is entirely open on its upper side but may be closed by a cover 41. The cover 41 is provided on its peripheral edges with a continuous downwardly extending flange which when the cover is closed contacts the upper edge of the horizontal portion of the arm bracket and forms in appearance a continuation thereof. It should also be noted that when the cover 41 is closed the said continuous flange overlies the upper end of the closure plate 36 and bears against the shoulder provided on said plate where its upper end is offset toward the left as viewed in Fig. 1. The cover 41 is connected to the horizontal portion 12 at the rear thereof by a plurality of hinges 42, wherefore said cover can be swung about a horizontal axis to either opened or closed position.

Figures 2, 3, 4:
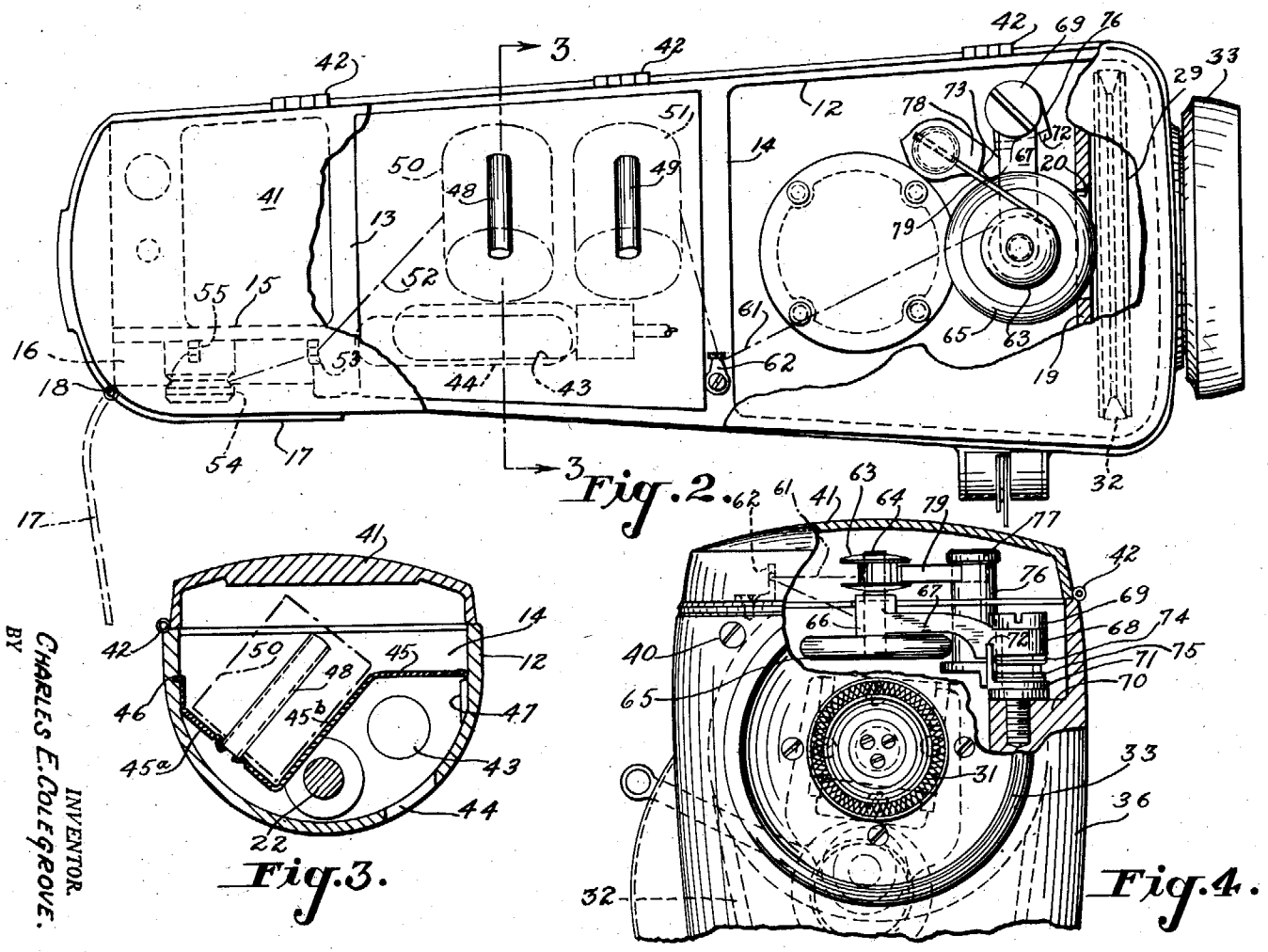
Fig. 2 is a top plan view of the arm bracket shown in Fig. 1 with portions of the top cover broken away.
Fig. 3 is a transverse sectional view through the horizontal portion of the arm bracket shown in Figs. 1 and 2 and is taken substantially on lines 3—3 of said figures looking in the direction of the arrows.
Fig. 4 is a fragmentary end elevational view of the upper part of the arm bracket and is taken looking from the right of Fig. 1 or Fig. 2, with certain portions broken away and shown in section.

It will be observed that the space in the horizontal portion of the arm bracket between the partitions 13 and 14 is unobstructed except for the needle bar shaft 22 and, if a sewing light bulb is employed, for the sewing light bulb 43, which latter is indicated diagrammatically in Figs. 2 and 3 by dot and dash lines and is shown as located above an opening 44 in the horizontal portion 12. Except for the needle bar shaft 22 and the light bulb 43 all of the space in the horizontal portion of the arm bracket between the partitions 13 and 14 is available for the mounting of spools of thread therein. These spools may be mounted in the hollow horizontal portion of the arm bracket in various manners and one form thereof is illustrated in the drawings and will be described herein by way of example. An irregularly shaped false bottom 45 is removably mounted in the horizontal portion intermediate the partitions 13 and 14. The false bottom 45 is provided at its rear edge with a flange 46 which extends into an elongated recess formed internally of the horizontal portion 12. The false bottom 45 extends vertically downwardly from the flange 46 a short distance and then is diagonally inclined downwardly and inwardly as indicated at 45*a*, after which the false bottom extends diagonally upwardly and outwardly as indicated at 45*b* so as to avoid the needle bar shaft 22 and the light bulb 43. The false bottom 45 extends horizontally from the upper end of the diagonally and upwardly inclined portion 45*b* thereof and the front edge of this horizontally extending portion of the bottom rests upon an internal ledge 47 formed in the hollow horizontal portion 12 of the arm bracket as clearly shown in Fig. 3. The false bottom 45 can be snapped into position in the arm bracket and will retain itself therein by its own resilience. Although one or more spools may be mounted in the horizontal portion of the arm bracket, two such spools are shown as so mounted for purposes of illustration. The downwardly inclined portion 45*a* of the false bottom has secured thereto upwardly extending spool posts 48 and 49 which are spaced from each other longitudinally of the horizontal portion and are substantially parallel to the upwardly inclined portion 45b of the false bottom. The spool 50 containing the needle thread is mounted on the post 48, while a spool 51 containing the thread that is to be wound on a bobbin carried by a concealed bobbin winder is mounted on the post 49. The arrangement of the posts 48 and 49 at the inclination shown conserves head room under the cover 41 for the spools 50 and 51. It will be understood, however, that the posts and spools could be arranged in upright or in any other convenient manner and the cover 41 could be increased in height if necessary to provide additional head room. It will also be understood that the false bottom 45 might be secured in position in the hollow horizontal portion of the arm bracket by means of anchoring screws or by other suitable means if so desired. Also it should be understood that the spool posts 48 and 49 might be directly carried by the arm bracket and the false bottom omitted.

The needle thread 52 from the spool 50 passes over the partition 13 and through an eye 53 located within the cavity 16. The thread 52 then passes downwardly within the cavity to the tension device 54 and thence upwardly within the cavity through the eye 55 of the take-up 56, which latter is concealed in the cavity. From the eye 55 the thread 52 passes downwardly within the cavity and is completely concealed substantially to the thread guide 57 on the needle clamp 58.

It will thus be seen that the needle thread, the tension device and the take-up are all concealed within the cavity 16 but that access thereto can readily be obtained by opening the door or closure 17. It will also be noted that access to the spools 50 and 51 can readily be obtained by swinging the cover 41 about the hinges 42.

Figure 5:
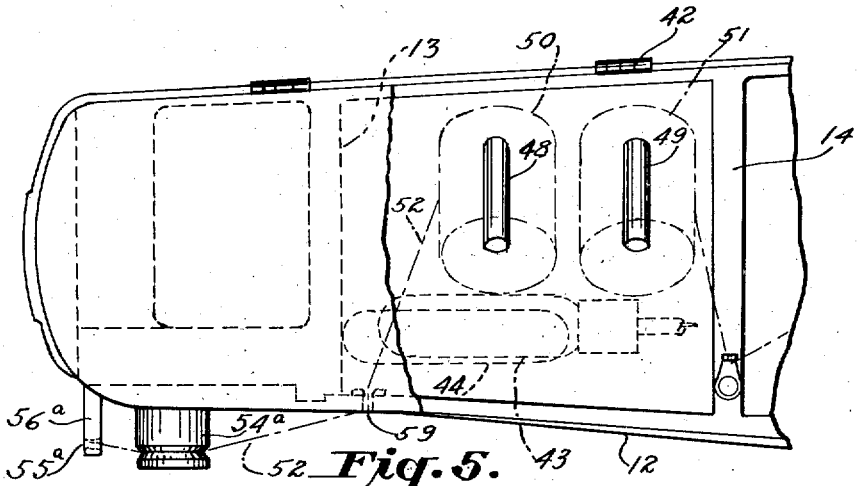
Fig. 5 is a fragmentary top plan view of the arm bracket illustrating a modified arrangement for leading the thread from the spool to the needle.
Figure 6:
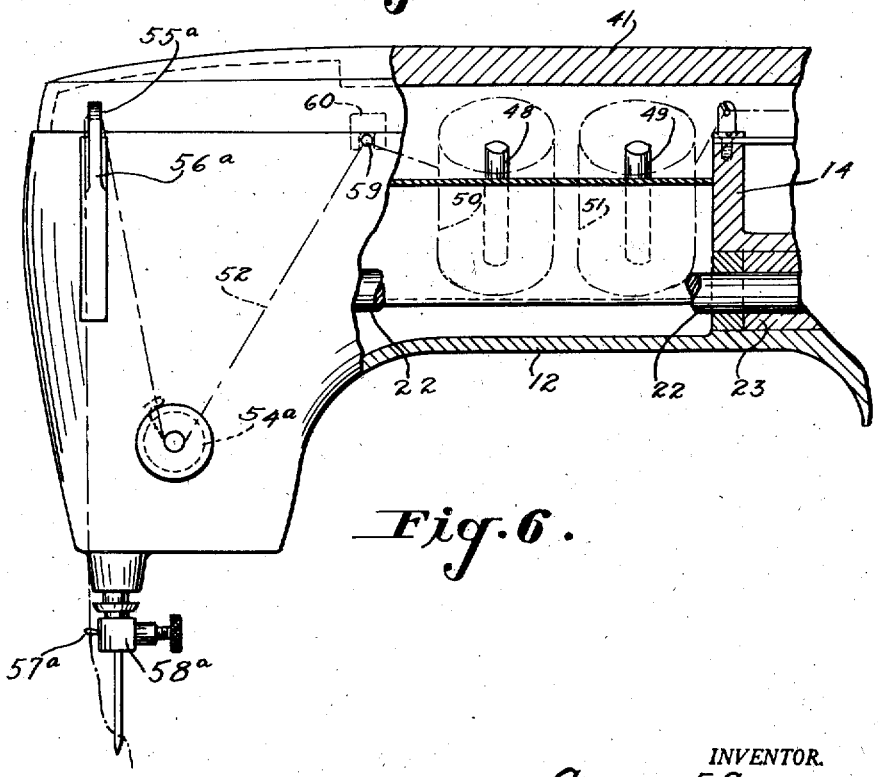
Fig. 6 is a fragmentary view, partly in front elevation and partly in section, showing the arrangement of the needle thread illustrated in Fig. 5.

In some cases it may be more desirable not to provide the cavity 16 and not to conceal the needle thread as it passes from the spool 50 to the needle. An illustration of an arrangement wherein the cavity 16 would be omitted as would also the door or closure 17 and the needle thread would be exposed as well as the tension device and take-up is shown in Figs. 5 and 6. In these views the thread 52 passes from the spool 50 to a notch 59 in the front edge of the horizontal portion 12 of the arm bracket. The thread 52 passes from the notch 59 forwardly in front of the left hand end of the horizontal portion to the tension device 54a which is mounted in exposed position on the front of the arm bracket. The thread 52 passes upwardly from the tension device 54a and in front of the arm bracket to the eye 55a of the take-up device 56a and which device, in this instance, moves up and down in exposed position in front of the arm bracket. The thread 52 extends downwardly from the eye 55a to the thread guide 57a of the needle clamp 58a. In order that the thread 52 will be held in the notch 59 the cover 41 is provided with a member 60 having in its lower edge a notch complementary to the notch 59, wherefore when the cover is closed the notch 59 and the notch in the lower edge of the member 60 constitute a substantially continuous orifice through which the thread passes and by which it is guided. Except for the omission of the cavity 16 and the location of the tension and take-up devices on the front of the horizontal portion of the arm bracket, the construction shown in Figs. 5 and 6 is identical with that shown in the other views of the drawings.

The thread 61 from the spool 51 passes through a thread guide or eyelet 62 secured on the upper end of the partition 14 and thence to a bobbin mounted on a bobbin winder which is concealed in the horizontal portion of the arm bracket. The said bobbin is indicated at 63 and is removably mounted and held on the split upper end of the vertically disposed spindle 64 of the bobbin winder. The lower end of the spindle 64 has fixed thereto a friction wheel 65 which when the bobbin winder is operating extends through the slot or opening 20 in the wall 19 and engages the inner face of the pulley 29 and is driven by the rotation of said pulley.

The spindle 64 of the bobbin winder is rotatably supported to turn on a vertical axis in a hub 66 formed on the free end of an arm 67, the other end 68 of which arm is rockably supported on a stud 69 that is detachably carried by a lug 70 formed internally of the arm bracket. A latch plate 71 is also rockably mounted on the stud 69 with said latch plate and said arm 67 being capable of rocking movement in unison or relative to each other. The latch plate 71 is provided with an upturned portion 72 which contacts a side of the arm 67 so that rocking movement of the latch plate in a clockwise direction, as viewed in Fig. 2, causes the arm 67 to move with it in unison. The latch plate 71 is also provided with an extended cam portion 73 for a purpose later to be explained. A spring 74 and a spring 75 are mounted on the stud 69 with one of said springs arranged to normally rock the latch arm 71 in said clockwise direction, wherefore the upward projection 72 will cause a similar rocking movement in the arm 67, with a resultant disengagement of the friction wheel 65 from the inner face of the pulley 29. The other of said springs acts on the arm 67 to move the latter against the projection 72 and in a direction to engage the friction wheel 65 with the inner face of the pulley 29. A sleeve 76 is rockably mounted on a vertically extending stud 77 which is secured internally of the arm bracket. The sleeve 76 has fixed thereto adjacent its lower end an arm 78, the free end of which is provided with a cam surface that contacts the cam surface on the part 73 of the latch plate 71 and when so engaged will act to hold the latch plate against rocking movement under the influence of the first spring previously referred to and consequently at such time the friction wheel 65 will be held in engagement with the inner surface of the pulley 29 by the other of said springs and as clearly indicated in Figs. 1 and 2. The arm 78 is, in other words, a latch which engages the portion 73 of the latch plate to latch the bobbin winder in its operative or driven position.

A blade 79 has one of its ends fixed to the sleeve 76 adjacent the upper end of the latter while its outer or free end extends to such location that it will lie between the flanges of the bobbin 63 when the latter is mounted on the spindle 64. It will be seen that when the bobbin winder is in the position shown in Figs. 1 and 2 that is the operative position and a bobbin 63 is mounted on the upper end of the spindle and the thread 61 is being wound on the bobbin said blade 79 contacts the thread as it is wound on the bobbin and when a sufficient quantity of thread has been wound thereon the blade 79 will be moved and the sleeve 76 rocked. The result is that the latch 78 simultaneously will be rocked and disengaged from the portion 73 of the latch plate 71, whereupon said latch plate 71 and arm 67 will rock in said clockwise direction under the action of the first spring before referred to and the friction wheel will be disengaged from the inner surface of the pulley 29 and the bobbin winder will then be in its inoperative position.

It will be noted that all that is necessary for the operator to do when it is desired to wind thread on the bobbin 63 is to raise the cover 41, place the bobbin on the split upper end of the spindle, reeve the thread 61 through the eyelet 62 and start it on the bobbin. After this has been done the arm 67 is rocked manually to bring the friction wheel into engagement with the pulley 29 and the latch 78 is engaged with the portion 73 of the latch plate 71. As soon as the desired amount of thread has been wound on the bobbin the blade 79 is moved automatically and the sleeve 76 and arm 78 rocked to release the bobbin winder so the latter returns to its inoperative position. The operator may then remove the bobbin from the upper end of the spindle 64 and close the cover 41, whereupon the bobbin winder is completely concealed.

From the foregoing detailed description of an embodiment of the invention it will have been seen that all of the objects enumerated earlier herein are fuly attained, together with the advantages incident to the construction.

Although specific constructions have been illustrated and described herein, it should be understood the invention is susceptible of various modifications and adaptations within the scope of the appended claims.

Having thus described my invention, I claim:

1. In a sewing machine, a bed-plate, a stationary arm bracket having a vertical portion carried by said bed plate and a hollow horizontal portion extending laterally from the upper end of the vertical portion and overlying and substantially parallel to said bed plate and provided with a free end having a downwardly extending enlargement, a needle bar, take up and tension device mounted by said enlargement; said horizontal portion being provided with a wall opening communicating with the hollow interior of said portion, movable closure means for said opening, means within the hollow interior of said horizontal portion intermediate said enlargement and said vertical portion and accessible through said opening and upon which a spool of thread may be mounted, housed and concealed within the hollow interior and by the walls of said horizontal portion and by said closure means, and means for guiding the thread from said spool to said tension device, take-up and needle bar.

2. In a sewing machine, a bed plate, a stationary arm bracket having a vertical portion carried by said bed plate and a hollow horizontal portion extending laterally from the upper end of the vertical portion and overlying and substantially parallel to said bed plate and provided with a free end having a downwardly extending enlargement, a needle bar mounted within said enlargement, a take-up and a tension device mounted on the exterior of said enlargement, said horizontal portion being provided with a wall opening communicating with the hollow interior of said hollow portion, movable closure means for said opening, means within the hollow interior of said horizontal portion intermediate said enlargement and said vertical portion and upon which a spool of thread may be mounted, housed and concealed within the hollow interior and by the walls of said horizontal portion and by said closure means, and means carried by said horizontal portion for guiding the thread from said spool of thread through the hollow interior of the horizontal portion and to the exterior of said portion and to said tension device.

3. In a sewing machine, a bed plate, a stationary arm bracket having a vertical portion carried by said bed plate and a hollow horizontal portion extending laterally from the upper end of the vertical portion and overlying and substantially parallel to said bed plate, driving mechanism for the machine mounted by said vertical portion, a needle bar shaft mounted by said horizontal portion and operatively associated with said mechanism, said horizontal portion being provided with a wall opening communicating with the hollow interior of the horizontal portion adjacent the vertical portion, a bobbin winder mounted in the hollow interior of the horizontal portion and accessible through said opening, said bobbin winder being located in close proximity to a portion of said mechanism and adapted to be operatively associated therewith and a movable closure for said opening.

4. In a sewing machine, a bed plate, a stationary arm bracket having a vertical portion carried by said bed plate and a hollow horizontal portion extending laterally from the upper end of the vertical portion and overlying and substantially parallel to said bed plate and having a free end, said horizontal portion being provided with a wall opening communicating with the hollow interior of the horizontal portion, a bobbin winder mounted in the hollow interior of said horizontal portion adjacent said vertical portion and accessible through said opening, means mounted in the hollow interior of said horizontal portion intermediate said bobbin winder and said free end of said horizontal portion and accessible through said opening and upon which a spool of thread may be mounted, movable closure means for said opening, and means for guiding the thread from the spool of thread to a bobbin mounted on said bobbin winder.

5. In a sewing machine, a bed plate, a stationary arm bracket having a vertical portion carried by said bed plate and a hollow horizontal portion extending laterally from the upper end of the vertical portion and overlying and substantially parallel to said bed plate and provided with a free end having a downwardly extending enlargement; a needle bar, take-up and tension device mounted by said enlargement; said horizontal portion being provided with a wall opening communicating with the hollow interior of the hollow portion, movable closure means for said opening, means within the hollow interior of said horizontal portion intermediate said enlargement and said vertical portion and accessible through said opening and upon which spools of thread may be mounted, housed and concealed by the walls of said horizontal portion, and a bobbin winder mounted and concealed within the hollow interior of said horizontal portion adjacent to said vertical portion, and means for guiding thread from one of said spools to said tension device, take-up and needle bar and from another of said spools to a bobbin mounted on said bobbin winder.

6. In a sewing machine, a bed plate, a stationary arm bracket having a vertical portion carried by said bed plate and a hollow horizontal portion extending laterally from the upper end of the vertical portion and overlying and substantially parallel to said bed plate and provided with a free end having a downwardly extending enlargement; a needle bar, take-up and tension device mounted by said enlargement; said horizontal portion being provided interiorly with partition walls forming within said horizontal portion a cavity intermediate said enlargement and said vertical portion, said horizontal portion being provided with a wall opening communicating with said cavity, movable closure means for said opening, means located within said cavity and accessible through said opening and upon which a spool of thread may be mounted, housed and concealed within said horizontal portion, and means for guiding the thread from said spool to said tension device, take-up and needle bar.

7. In a sewing machine, a bed plate, a stationary arm bracket having a vertical portion carried by said bed plate and a hollow horizontal portion extending laterally from the upper end of the vertical portion and overlying and substantially parallel to said bed plate, driving mechanism for the machine supported by said vertical portion, a needle bar shaft supported by said horizontal portion, said horizontal portion being provided interiorly with a partition wall providing a cavity interiorly of the horizontal portion adjacent to said vertical portion, a wall opening in said horizontal portion communicating with said cavity, a bobbin winder mounted in said cavity in proximity to said mechanism and adapted to be operatively associated with a portion thereof, and movable closure means for said opening.

8. In a sewing machine, a bed plate, a stationary arm bracket having a vertical portion carried by said bed plate and a hollow horizontal portion extending laterally from the upper end of the vertical portion and overlying and substantially parallel to said bed plate and provided with a free end, driving mechanism for the machine supported by said vertical portion, a needle bar shaft supported by said horizontal portion and operatively associated with said mechanism, said horizontal portion being provided interiorly with partition walls forming within said horizontal portion a cavity adjacent to said vertical portion and a cavity intermediate said vertical portion and said free end of the horizontal portion, a bobbin winder mounted and concealed within said first cavity in close proximity to said mechanism and adapted to be operatively associated with a portion thereof, means within said second cavity upon which a spool of thread may be mounted, housed and concealed, said horizontal portion being provided with a wall opening affording access to said cavities, movable closure means for said opening, and means for guiding thread from said spool to said bobbin winder.

9. In a sewing machine, a bed plate, a stationary arm bracket having a vertical portion carried by said bed plate and a hollow horizontal portion extending laterally from the upper end of the vertical portion and overlying and substantially parallel to said bed plate and provided with a free end having a downwardly extending hollow enlargement, said horizontal portion being provided interiorly with partition walls forming within said horizontal portion a plurality of cavities, one of which cavities is within said enlargement; a needle bar, take-up and tension device mounted in said one cavity; another of which cavities is intermediate said enlargement and said vertical portion, said horizontal portion being provided with wall openings communicating respectively with said cavities, movable closure means for said openings, a needle bar shaft rotatably supported in said horizontal portion by said walls and extending longitudinally of said horizontal portion from said vertical portion to said enlargement, means within the interior of said horizontal portion and located within said another cavity and accessible through one of said openings and upon which a spool of thread may be mounted, housed and concealed within said horizontal portion, and means for guiding the thread from said spool to said tension device and take-up.

10. In a sewing machine, an arm bracket having a horizontal portion provided with a free end having a cavity provided with an open side facing toward the operator of the machine, a tension device and take up mounted in said cavity, a closure for said cavity, said portion inwardly of said free end being substantially hollow and open on one side, a closure for said open side, a bobbin winder mounted within the substantially hollow portion, means within said substantially hollow portion and upon which spools of thread may be mounted, and means within said horizontal portion for leading the thread upon one of said spools to said tension device and take-up and from another of said spools to a bobbin mounted on said bobbin winder.

11. In a sewing machine, an arm bracket having a horizontal portion, said portion being provided with a free end having a cavity opening toward the operator of the machine, a closure for said cavity, said portion being substantially hollow and open at the top, a closure for said top and extending substantially the length of said portion, a tension device and take-up mounted in said cavity, a bobbin winder mounted within said horizontal portion, means within said horizontal portion upon which spools of thread may be mounted, and means within said horizontal portion for guiding the thread from one of said spools of thread to said tension device and take-up and from another of said spools of thread to a bobbin mounted on said bobbin winder.

12. In a sewing machine, an arm bracket having a horizontal portion provided with a cavity open at the top, a closure for said open top of said cavity, a needle bar shaft rotatably supported in said horizontal portion and extending through said cavity, a false bottom mounted in said cavity and having a part overlying said shaft, and means carried by said bottom and extending at an angle to the perpendicular and upon which a spool of thread may be mounted.

13. In a sewing machine, an arm bracket having a horizontal portion provided with a cavity open at the top thereof, a closure for said cavity, a needle bar shaft mounted in said portion and extending through said cavity, a false bottom mounted in said cavity and having a downwardly and inwardly inclined part and an upwardly and outwardly inclined part avoiding said shaft, a post carried by said first part and arranged at an angle to the perpendicular and adapted to have a spool of thread mounted thereon and concealed within said horizontal portion.

14. In a sewing machine, an arm bracket having a horizontal portion provided with a cavity therein open at the top, a bobbin winder mounted in said cavity and including a bobbin receiving spindle extending vertically thereof and having fixed thereto a friction wheel, said arm bracket including an end wall provided with a bearing through which a needle bar shaft rotatably extends, a driving pulley mounted on said shaft exteriorly of said wall, said wall being provided with an opening through which said friction wheel projects into driving contact with said pulley, when said bobbin winder is operating, a driving connection to said pulley exteriorly of said wall, a closure member cooperating with said wall to conceal said pulley and driving connection, and a closure member for said cavity and cooperating with said first named closure member to provide a symmetrical appearance to the arm bracket.

15. In a sewing machine, a bed plate, a stationary arm bracket having a vertical portion carried by said bed plate and a hollow horizontal portion extending laterally from the upper end of the vertical portion and overlying and substantially parallel to said bed plate and provided with a free end having a downwardly extending enlargement, said hollow portion being provided interiorly with partition walls dividing the interior of said hollow portion into a plurality of cavities, said hollow portion being provided with wall openings communicating with said cavities, movable closure means for said openings, one of said cavities being located in said enlargement; a needle bar, take-up and tension device mounted in said one cavity; another of said cavities having means therein upon which spools of threads may be mounted and concealed within said hollow portion, and a third cavity having mounted and concealed therein a bobbin winder, said spools and said bobbin winder being accessible through one of said wall openings, and means for guiding the thread from one of said spools to said tension device and take-up and from another of said spools to said bobbin winder.

CHARLES E. COLEGROVE.